J. R. GAMMETER.
WIRE CABLE RING AND METHOD OF MAKING THE SAME.
APPLICATION FILED DEC. 11, 1916.
1,267,396.
Patented May 28, 1918.
2 SHEETS—SHEET 2.
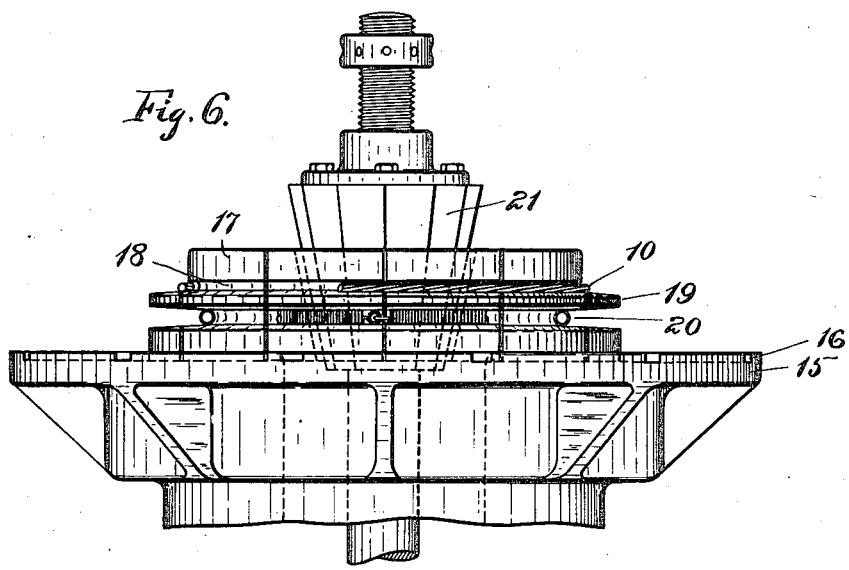
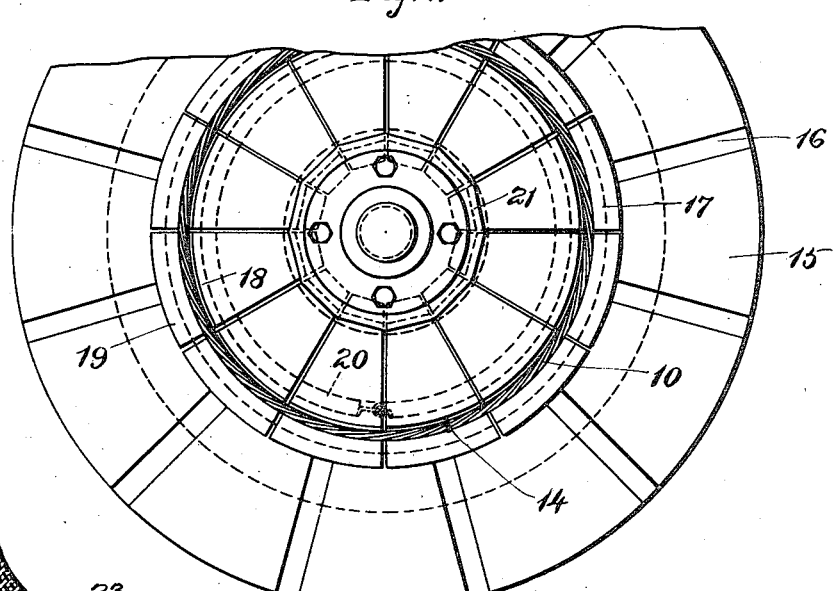
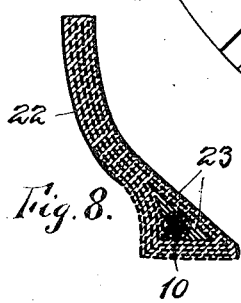
INVENTOR.
John R. Gammeter
BY
Robert M. Pierson
ATTORNEY

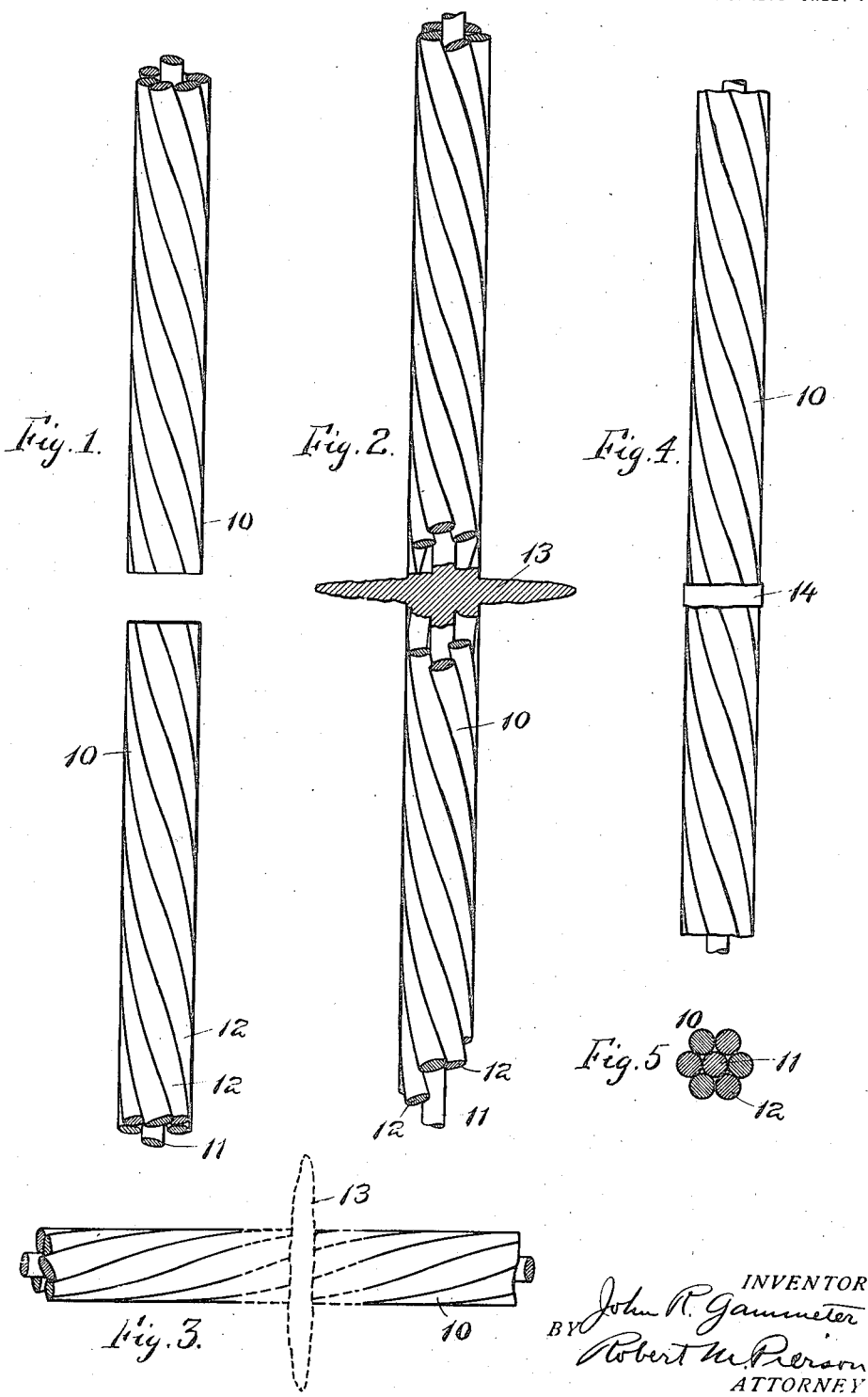

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

WIRE-CABLE RING AND METHOD OF MAKING THE SAME.

1,267,396.    Specification of Letters Patent.    Patented May 28, 1918.

Application filed December 11, 1916. Serial No. 136,172.

*To all whom it may concern:*

Be it known that I, JOHN R. GAMMETER, a citizen of the United States, residing at Akron, in the county of Summit and State of Ohio, have invented certain new and useful Improvements in Wire-Cable Rings and Methods of Making the Same, of which the following is a specification.

This invention relates to rings made of a plurality of wires twisted or cabled together and adapted especially to form the cores or strength-giving members of pneumatic-tire beads. In pneumatic tires of the so-called straight-side or straight-bead type, the bead must be practically inextensible and it has heretofore been a matter of difficulty to secure this quality in automobile tires without considerable expense. The principal object of my invention is to provide a stranded wire ring of great strength and sufficient flexibility which can be manufactured at a smaller expense than prior inextensible bead cores for automobile tires, and can be used for this or any other purpose for which it may be found suitable.

Of the accompanying drawings,

Figure 1 is a plan view showing the two ends of a length of wire cable adapted to be joined in accordance with my invention.

Fig. 2 is a similar view, partly in section, after the ends have been welded together.

Fig. 3 is a plan view indicating conventionally the result of the weld-annealing step.

Fig. 4 is a similar view after the trimming of the weld.

Fig. 5 is a cross-section of the cable.

Fig. 6 is a side elevation of a radial stretching and sizing apparatus with one of the rings in place thereon.

Fig. 7 is a plan view of said parts.

Fig. 8 is a cross-section showing the bead of a tire casing provided with one of my improved core rings.

Referring to the drawings, 10 represents a wire cable made with a central or core strand 11 about which are twisted a suitable number (six in this case) of wire strands 12, these strands being preferably made of low-carbon steel wire suitable for electric welding. This piece of cable is cut to such a length as will make a ring of slightly less than the desired circumference, and its ends are placed in an electric welder and joined as indicated in Fig. 2, 13 representing the fin or "flash" which is afterward removed by grinding or otherwise so as to leave the joint 14 substantially cylindrical and nearly flush with the surface of the ring as represented in Fig. 3.

An important detail consists in annealing the welded joint so as to increase its strength by the removal of shrinkage strains produced in the first cooling of the weld. To fuse the ends of the cable, the electrodes of the welding machine are placed relatively close together so as to concentrate the heating effect of the current as much as possible, and produce a white or welding heat. Then, for the annealing step, the electrodes are loosened and reclamped upon the ring on opposite sides of the weld, but at a greater distance apart, whereupon, a second momentary application of current brings the metal in a zone represented approximately by the dotted lines in Fig. 3 to a red heat, after which it is allowed to cool in the air, and then trimmed as described. This makes a joint whose strength approaches very near to that of the body of the wire cable and allows the necessary factor of safety to be attained with a cable of moderate cross-sectional area, because the weld is composed of strand metal in substantially the same molecular condition as that of the strands.

The next step consists in stretching the annular welded cable to bring it to the exact desired circumference and incidentally by so doing to test the strength of the welded joint. This is done in a machine represented in Figs. 6 and 7, which consists essentially of a circular bed plate 15 having radial guide grooves for a series of radially-movable blocks or segments 17 which are circumferentially grooved at 18 to receive the ring 10, there being a shelf or flange 19 on the blocks just below this groove and an annular retracting spring 20 encircling the blocks in a groove below the flange 19. A pyramidal wedge member 21, acting upon the inner ends of the blocks 17, by its descending movement to a predetermined position, forces the blocks outwardly to perform the stretching and sizing operation as will be evident, and when said member is withdrawn upwardly the spring 20 retracts the blocks 17 so as to release the ring.

In Fig. 8, 22 is the wall of a tire casing and 10 is the cabled-wire bead core which may, if desired, have a wrapping of fabric and suitable filler strips 23 to produce proper adhesion and fill out the triangular shape of the bead cavity.

While it is common to employ a single solid metal ring or wire as a bead core for bicycle tire-casings, and it has been proposed to use a single cabled-wire ring of the proper size as the bead-core of an automobile tire casing, the commercial practice in the latter situation has, so far as I am aware, been confined to the use of many successive windings or coils of wire in the form of one or more bundles of strands, or flat braided-wire tapes, or else small cotton-covered wire cables or bundles of fine wires made up in many convolutions into the form of a bead filler triangular in cross-section. All such methods are quite expensive as compared with my present invention, and many of them produce cores inferior in strength and other desirable qualities, the present invention being, as I believe, the first to provide a cabled-wire ring with a weld of ample strength joining all the strands at a single point in the circumference of the ring. Wire cable of indefinite length suitable for making these rings by the process described may be purchased in the open market, or may be very readily produced with suitable machinery.

I claim:

1. The process of making pneumatic-tire bead-core rings which consists in welding together the ends of a length of wire cable to make a ring of slightly less than the ultimate circumference, separately annealing the welded joint, and stretching said ring to the desired size.

2. The process of making pneumatic-tire bead-core rings which consists in taking a piece of wire cable which will make a ring of slightly less than the desired circumference, butting the ends, fusing the strand metal at the ends to produce a welded joint and expanding said ring to the desired size by an outward radial stretching action exerted simultaneously at various points throughout its circumference.

3. The process of making pneumatic-tire bead-core rings which consists in taking a piece of wire cable which will make a ring of slightly less than the desired circumference, butting the ends, fusing the strand metal at the ends to produce a welded joint, annealing said joint by a separate operation, and expanding said ring to the desired size by an outward radial stretching action exerted simultaneously at various points throughout its circumference.

4. A pneumatic-tire bead-core ring composed of wire strands twisted together, all of said strands having their ends welded together at one point in the circumference of the ring, the weld being of strand metal in substantially the same molecular condition as that of the strands.

In testimony whereof I have hereunto set my hand this second day of December 1916.

JOHN R. GAMMETER.